(12) United States Patent
Chin et al.

(10) Patent No.: US 7,965,631 B2
(45) Date of Patent: Jun. 21, 2011

(54) METHODS AND SYSTEMS FOR LOAD-ADAPTIVE BACKOFF FOR WIMAX RANGING

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 12/337,633

(22) Filed: Dec. 18, 2008

(65) Prior Publication Data

US 2010/0157796 A1    Jun. 24, 2010

(51) Int. Cl.
*H04L 12/26* (2006.01)
(52) U.S. Cl. .................. 370/230.1; 370/252
(58) Field of Classification Search .......... 370/208, 370/229–238, 252
See application file for complete search history.

(56) References Cited

U.S. PATENT DOCUMENTS

| | | | |
|---|---|---|---|
| 7,260,081 B2 * | 8/2007 | Lee et al. | 370/348 |
| 7,586,932 B2 * | 9/2009 | Chou et al. | 370/445 |
| 2004/0264423 A1 * | 12/2004 | Ginzburg et al. | 370/338 |
| 2009/0129404 A1 * | 5/2009 | Wu et al. | 370/468 |
| 2009/0197611 A1 * | 8/2009 | Chin et al. | 455/452.2 |
| 2010/0093347 A1 * | 4/2010 | Hahn et al. | 455/435.1 |
| 2010/0150035 A1 * | 6/2010 | Tao et al. | 370/280 |

* cited by examiner

*Primary Examiner* — Ricky Ngo
*Assistant Examiner* — Gary Mui
(74) *Attorney, Agent, or Firm* — Milan I. Patel

(57) ABSTRACT

Certain embodiments of the present disclosure provide an adaptive technique to determine size of a ranging back-off window according to a load of ranging channel. By applying an adaptive increase of the back-off window size, a probability of collision between ranging codes within a same transmission opportunity can be alleviated, and the ranging channel load can be decreased more efficiently than in the case of a standard non-adaptive back-off procedure.

36 Claims, 9 Drawing Sheets

US 7,965,631 B2

METHODS AND SYSTEMS FOR LOAD-ADAPTIVE BACKOFF FOR WIMAX RANGING

TECHNICAL FIELD

Certain embodiments of the present disclosure generally relate to a wireless communication and, more particularly, to a method for reducing a ranging channel load.

SUMMARY

Certain embodiments provide a method for a wireless communication system. The method generally includes monitoring a number of transmission opportunities L allocated for a ranging channel over a period of N uplink frames, monitoring a number of received range-response messages K that contain information about ranging codes transmitted in M uplink frames, estimating a ranging channel loading factor at or after the Mth uplink frame as a function of K and L, and adjusting a size of a ranging back-off window based on the ranging channel loading factor.

Certain embodiments provide an apparatus for a wireless communication system. The apparatus generally includes logic for monitoring a number of transmission opportunities L allocated for a ranging channel over a period of N uplink frames, logic for monitoring a number of received range-response messages K that contain information about ranging codes transmitted in M uplink frames, logic for estimating a ranging channel loading factor at or after the Mth uplink frame as a function of K and L, and logic for adjusting a size of a ranging back-off window based on the ranging channel loading factor.

Certain embodiments provide an apparatus for a wireless communication system. The apparatus generally includes means for monitoring a number of transmission opportunities L allocated for a ranging channel over a period of N uplink frames, means for monitoring a number of received range-response messages K that contain information about ranging codes transmitted in M uplink frames, means for estimating a ranging channel loading factor at or after the Mth uplink frame as a function of K and L, and means for adjusting a size of a ranging back-off window based on the ranging channel loading factor.

Certain embodiments provide a computer-program product for a wireless communication system comprising a computer readable medium having instructions stored thereon, the instructions being executable by one or more processors. The instructions generally include instructions for monitoring a number of transmission opportunities L allocated for a ranging channel over a period of N uplink frames, instructions for monitoring a number of received range-response messages K that contain information about ranging codes transmitted in M uplink frames, instructions for estimating a ranging channel loading factor at or after the Mth uplink frame as a function of K and L, and instructions for adjusting a size of a ranging back-off window based on the ranging channel loading factor.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
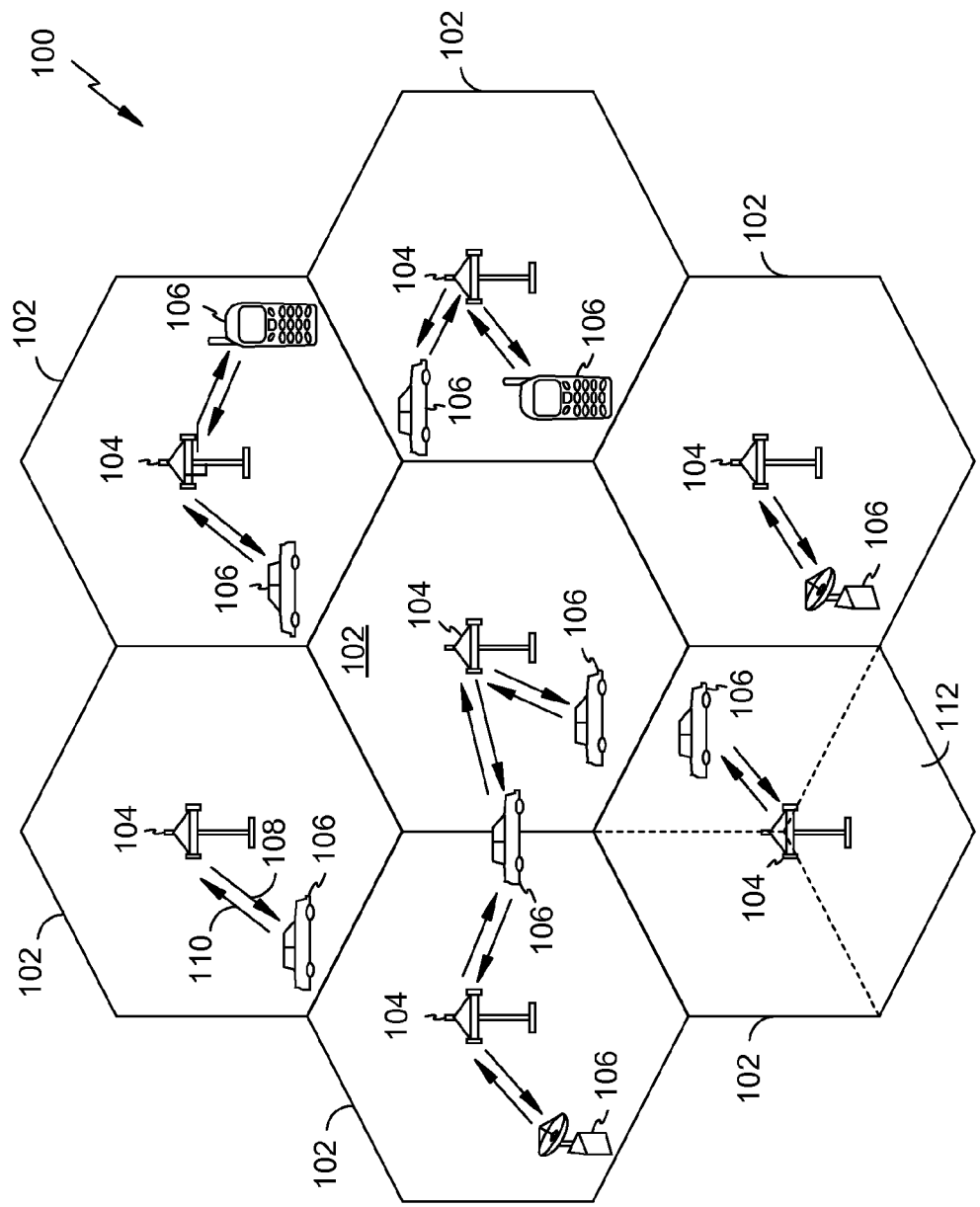
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

Worldwide Interoperability for Microwave Access (WiMAX) standard specifies a contention based ranging for initial synchronization where a mobile station (MS) can randomly choose a transmission opportunity (TO) within a ranging channel to send a ranging code to a serving base station (BS). The transmission opportunity can be defined as a slot in which the MS can be allowed to start a transmission of the ranging code. The ranging channel can be a part of the WiMAX uplink subframe and may comprise a plurality of TOs.

However, if more than one MS is sending the ranging code on the same TO, then there is a high probability that a collision with other ranging codes occurs and a transmission of ranging code can fail. In the case of collision, the MS may need to run a random ranging back-off to defer a retransmission. The random back-off may start with transmission of ranging code in a back-off window with an initial predetermined size. Every time when collision occurs, the back-off window size may be doubled until a predetermined maximum window size is reached. In this way, the ranging code with higher level of redundancy may be transmitted, which lowers the probability of transmission failure due to collision with other ranging codes.

However, the random back-off procedure may not quickly reduce a load of the ranging channel. In fact, it may take several back-off transmissions to stabilize the load of ranging channel, resulting in unnecessary delay in the ranging process.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 October 2005" in October 2005 for mobile BWA systems. The latest revision of the IEEE 802.16-2004, "IEEE P802.16Rev2/D6 July 2008", a draft standard, now consolidates materials from IEEE 802.16e and corrigendum. The standards define at least four different physical layers (PHYs) and one medium access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
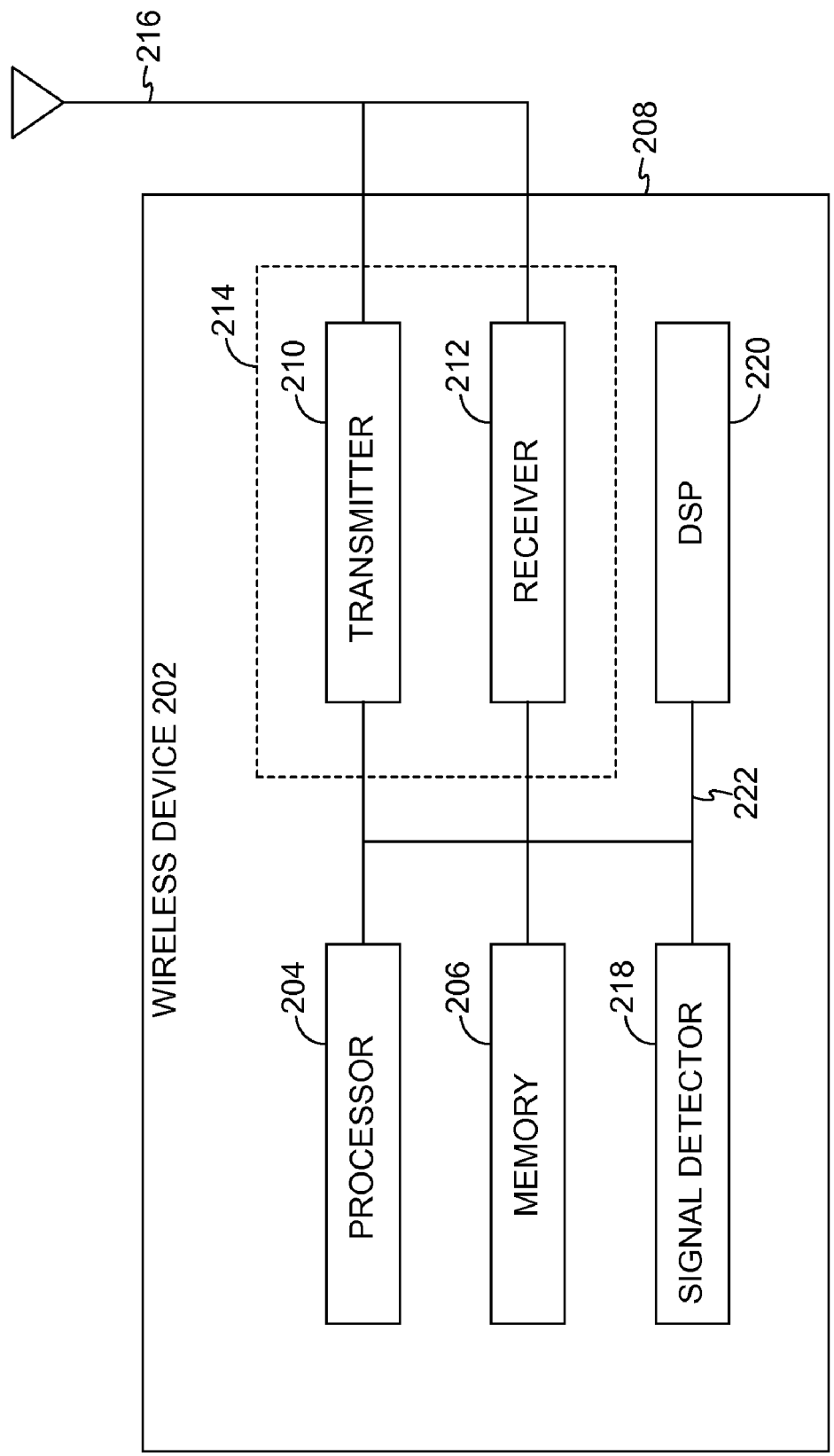
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
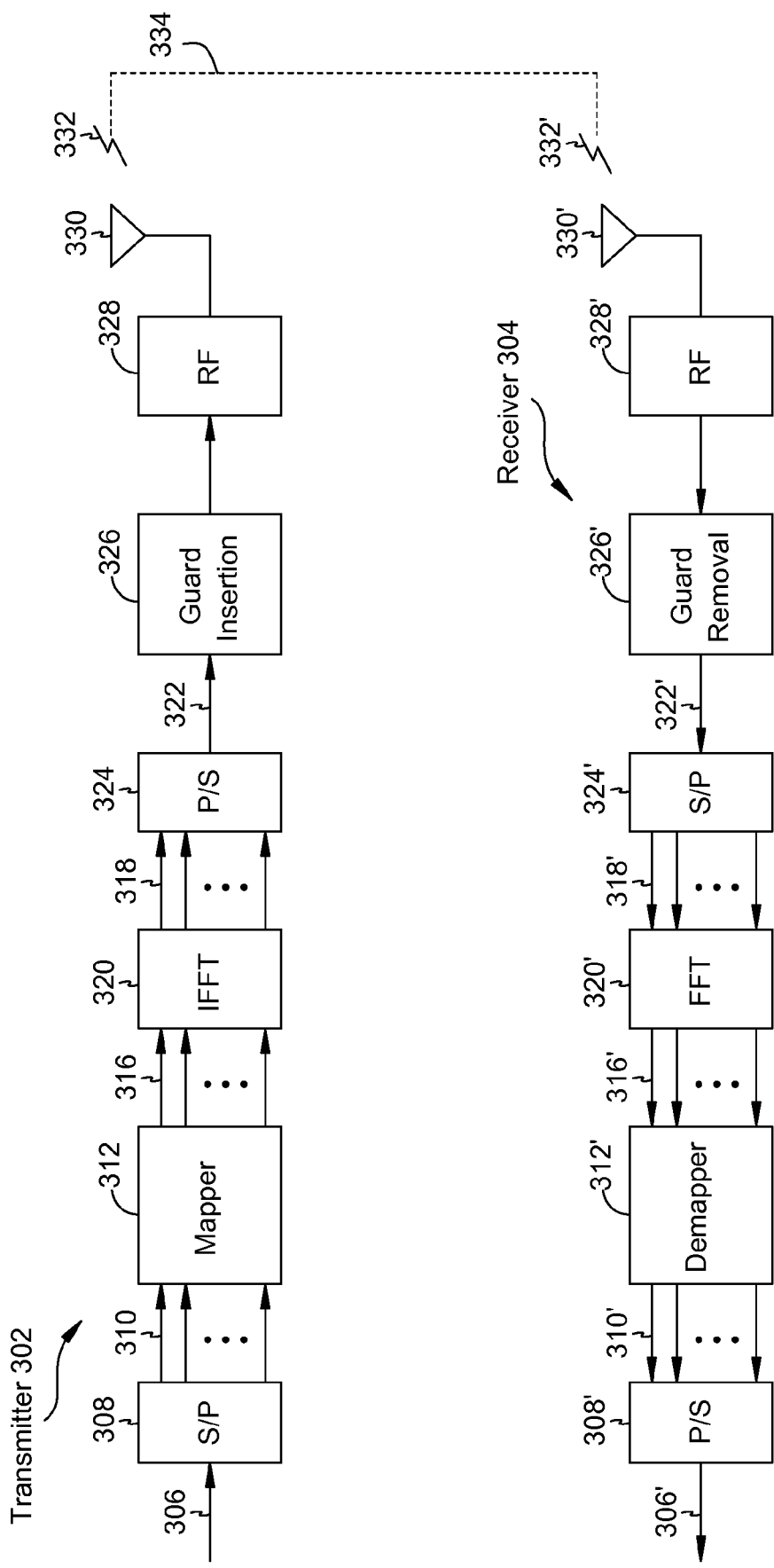
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, Ns, is equal to Ncp (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary OFDM/OFDMA Frame

Referring now to FIG. 4, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406— or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) outlining the frame configuration information may be mapped to the FCH 410.

Following the FCH 410, a DL-MAP 414 and a UL-MAP 416 may specify data burst allocation and other control information for the DL and UL subframes 402, 404. In the case of OFDMA, multiple users may be allocated data regions within the frame, and these allocations may be specified in the DL and UL-MAP messages 414, 416. The MAP messages may include the burst profile for each user, which defines the modulation and coding scheme used in a particular link. Since MAP messages contain critical information that needs to reach all users, the DL and UL-MAP messages 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Figure 4A:
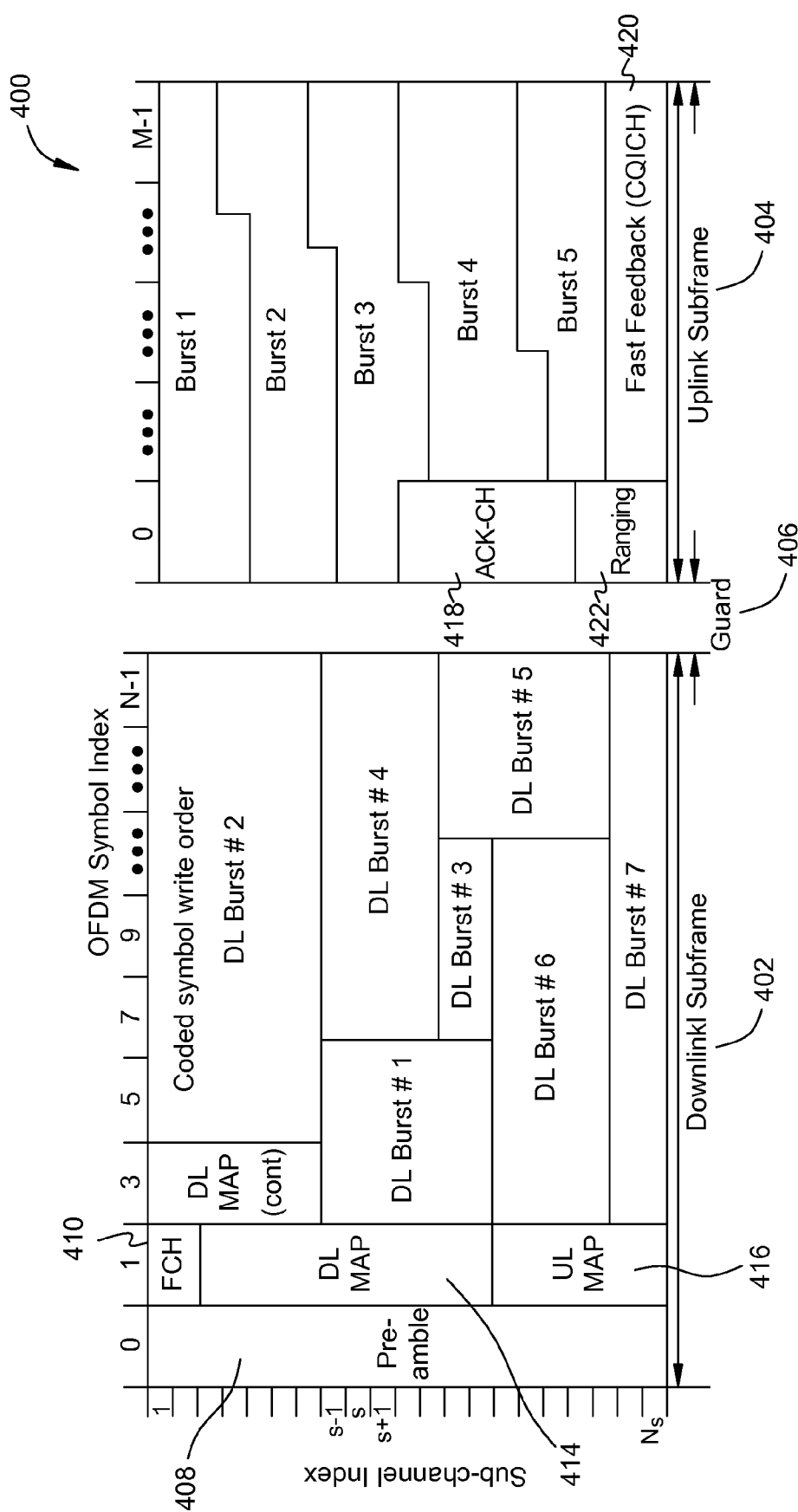
FIG. 4A illustrates an example OFDM/OFDMA frame for Time Division Duplex (TDD) in accordance with certain embodiments of the present disclosure.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

Figure 4B:
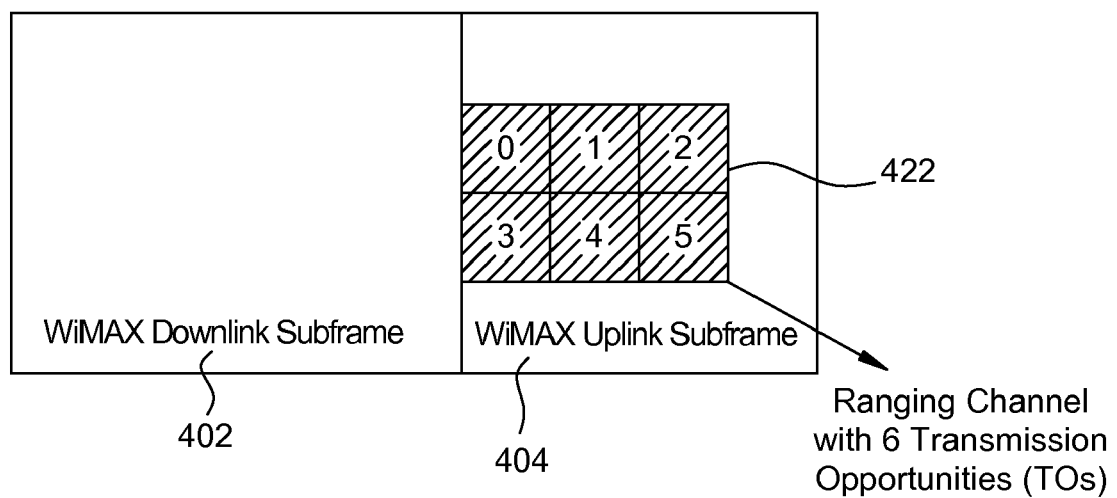
FIG. 4B illustrates an example structure of a ranging channel with a plurality of transmission opportunities in accordance with certain embodiments of the present disclosure.

FIG. 4B shows in more details an example structure of the ranging subchannel 422 with a plurality of transmission opportunities (TOs) as a part of the UL subframe 404. The transmission opportunity can be defined as any mini-slot in which a mobile station (MS) can be allowed to start a transmission of the ranging code. The number of allocated transmission opportunities within the subframe may be dependent on the total size of ranging channel as well as on the size of individual transmission.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two, and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary Extamation of the Ranging Channel Load

The WiMAX standard specifies a contention based ranging where an MS can randomly choose a transmission opportunity (TO) within a ranging channel to send a ranging code to a serving BS for the purpose of initial synchronization. If more than one MS is sending the ranging code on the same TO, then it is highly probable that a collision between different ranging codes occurs and the transmission of ranging code can fail. In the case of collision, the MS may need to run a random back-off procedure to defer retransmission and reduce the probability of transmission failure due to collision.

The random back-off procedure may start with a transmission of a ranging code in a back-off window with a predefined initial size. Every time when collision occurs, the back-off window size may be increased until a predefined maximum window size is reached. In this manner, the probability of transmission failure due to collision with other ranging codes is significantly lowered. An initial back-off window size and a final back-off window size may be predefined by the serving BS in the Uplink Channel Descriptor (UCD) broadcast message. For example, during an initial ranging, the type-length-values (TLVs) of "Initial Ranging Back-off Start" field and "Initial Ranging Back-off End" field are included in the UCD message.

However, the random back-off may not quickly reduce a load of the ranging channel. In fact, it may take several back-off transmissions to stabilize the load of the ranging channel. The present disclosure proposes a method that can allow the MS to adaptively adjust the back-off window size per the estimated ranging channel load.

In order to estimate the load of the ranging channel, the MS may monitor received ranging response (RNG-RSP) messages for several frames. The RNG-RSP message can indicate the TO and the frame number in which the MS may transmit the ranging code. Since the RNG-RSP message is a broadcast message (Connection Identifier, CID=0xFFFF), all mobile stations that are served by the same BS can receive and parse any broadcasted RNG-RSP message. If a high number of RNG-RSP messages are observed by the MS, then the MS may know that the load of the ranging channel is high.

Figure 5:
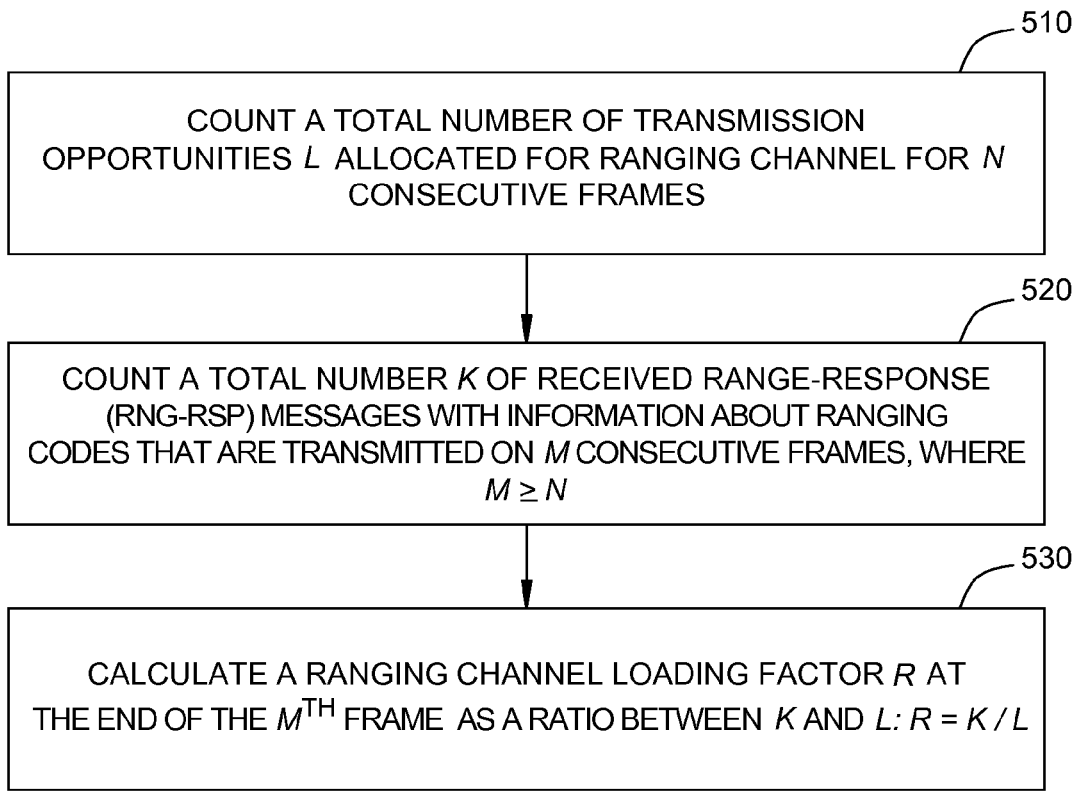
FIG. 5 shows a process of estimating a ranging channel loading factor in accordance with certain embodiments of the present disclosure

FIG. 5 shows a process of estimating a ranging channel loading factor. At the beginning of the process 500, at 510, the MS may monitor the number of TOs allocated for the ranging channel over N consecutive frames with frame numbers j, j+1, . . . , j+N−1, and count the total number of TOs over these frames:

$$L(j, j+N-1) = \sum_{i=j}^{i=j+N-1} u(i), \quad (1)$$

where u(i) is the number of TOs within the frame number i.

The MS may also monitor the received RNG-RSP messages starting from the frame number j for M consecutive frames, i.e. frame numbers: j, j+1, . . . , j+M−1. Since the RNG-RSP message has certain delay to be broadcasted and received after the ranging code is transmitted, the MS may need to monitor received RNG-RSP messages for several more frames compared to the number of frames utilized for monitoring of allocated ranging channel transmission opportunities. Therefore, for certain embodiments it may be that M≧N.

At 520, the MS may count the total number of monitored RNG-RSP messages with information about ranging codes that are being transmitted on frame numbers j, j+1, . . . , j+N−1. The total number of received RNG-RSP messages that comprise information about transmitted ranging codes may be denoted as:

$$K(j, j+M-1) = \sum_{i=j}^{i=j+M-1} v(i), \quad (2)$$

where v(i) is the number of broadcast RNG-RSP messages received on the frame number i indicating the ranging code being transmitted on frame numbers j, j+1, . . . , j+N−1.

At the end of the frame number j+M−1, at 530, the MS may calculate the ranging channel loading factor R as:

$$R=K(j,j+M-1)/L(j,j+N-1). \quad (3)$$

Once the ranging channel loading factor R is estimated, an adaptive method may be applied to decide a proper back-off window size for the ranging procedure.

Exemplary Adaptive Adjustment of the Ranging Back-Off Window Size

Figure 6:
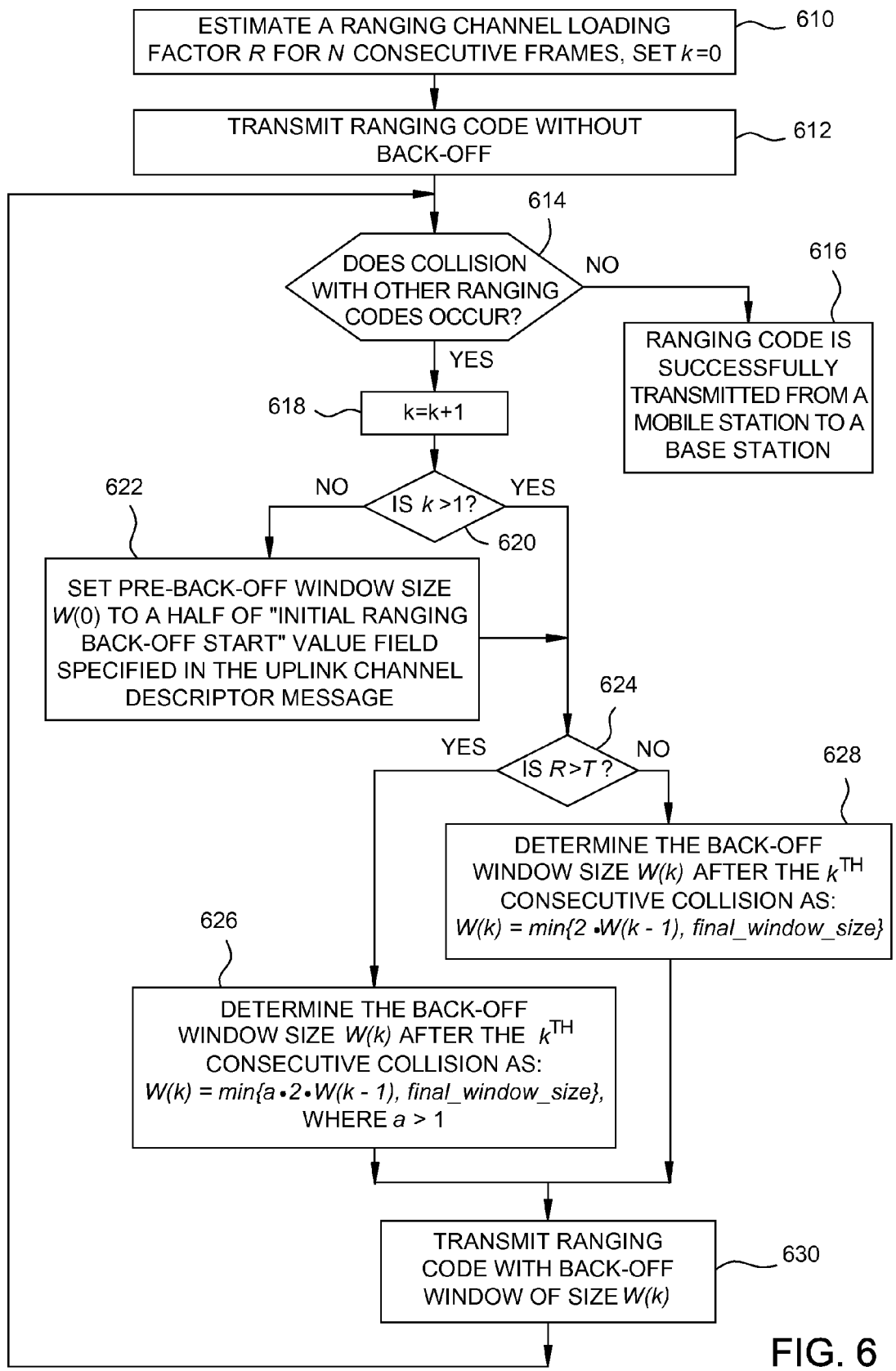
FIG. 6 shows a process of determining a proper ranging back-off window size based on a load of ranging channel in accordance with certain embodiments of the present disclosure.

FIG. 6 shows a process of determining a proper ranging back-off window size based on a ranging channel load. At the beginning of the process 600, at 610, a ranging channel loading factor R may be estimated for N consecutive frames, as given by the process 500. Also, a counter k for the number of consecutive collisions of ranging codes may be set to zero. At

612, an MS may transmit the ranging code to a serving BS without any back-off. If there is no collision with other ranging codes (decision step 614), then it can be assumed, at 616, that the ranging code is successfully transmitted from the MS to the serving BS.

Then again, if the collision occurs (decision step 614), then the counter k representing the number of consecutive collisions may be incremented, at 618. It can be denoted that after the kth consecutive collision, the back-off window size may be equal to W(k), where k≧1. For the first collision between ranging codes (decision step 620 for k=1), a pre-back-off window size W(0) may be set, at 622, according to a half value of the "Initial Ranging Back-off Start" field of the UCD message:

$$W(0) = 2^{Initial\_Ranging\_Backoff\_Start}/2. \quad (4)$$

Starting from the first collision between ranging codes, and continuing with the second consecutive collision and onwards (k>1), an adaptive formula for obtaining the back-off window size based on the ranging channel load may be applied. If the estimated ranging channel loading factor is greater than a predetermined threshold value T (decision step 624), then a more aggressive back-off procedure may be performed since a probability of collision with other ranging codes is higher. Therefore, at 626, the back-off window size W(k) may be increased more than twice compared to the previous size W(k−1) by applying the following recursive formula:

$$W(k) = \min\{\alpha \cdot 2 \cdot W(k-1), final\_window\_size\}, \quad (5)$$

where α>1 is a scaling factor that adjusts the back-off window size according to the ranging channel load. It can be observed that if α=1, then equation (5) becomes the existing back-off ranging scheme specified in the WiMAX standard. The value of final_window_size from equation (5) may be obtained according to the specified value of the "Initial Ranging Back-off End" field of the UCD message as:

$$final\_window\_size = 2^{Initial\_Ranging\_Backoff\_End}, \quad (6)$$

and it represents a predetermined maximum size of the back-off window.

By applying more aggressive ranging back-off, the ranging code with higher level of redundancy may be broadcasted in order to reduce a probability of transmission failure due to collisions with other ranging codes. In other words, the probability of successful transmission may increase more quickly than in the case of standard non-adaptive back-off procedure, which may also reduce the ranging channel load.

On the other hand, if the estimated ranging channel loading factor R is below the predetermined threshold value T (decision step 624), then the back-off window size W(k) after the kth consecutive collision may be increased by exactly two times compared to the previous value W(k−1), at 628, as given by:

$$W(k) = \min\{2 \cdot W(k-1), final\_window\_sizes\}, \quad (7)$$

where the parameter final_window_size may be defined as in equation (6). In other words, if the ranging channel load is not high, then the standard back-off procedure may be sufficient to quickly reduce the ranging channel load.

At 630, the ranging code may be transmitted from the MS to the serving BS in the back-off window of determined size W(k). If the collision between ranging codes does not occur (decision step 614), then it can be assumed, at 616, that the ranging code is successfully transmitted. Otherwise, the process of adaptive adjustment of the ranging back-off window size based on the ranging channel load may be repeated.

Figure 5A:
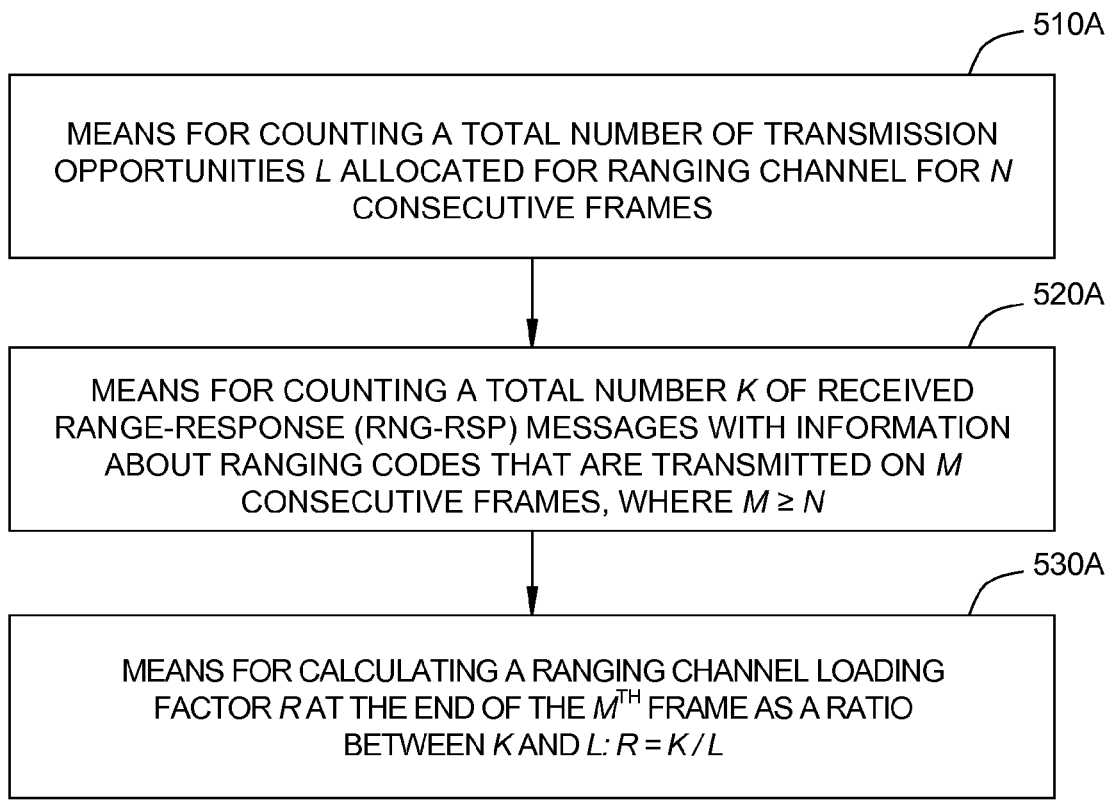
FIG. 5A illustrates example components capable of performing the operations illustrated in FIG. 5.
Figure 6A:
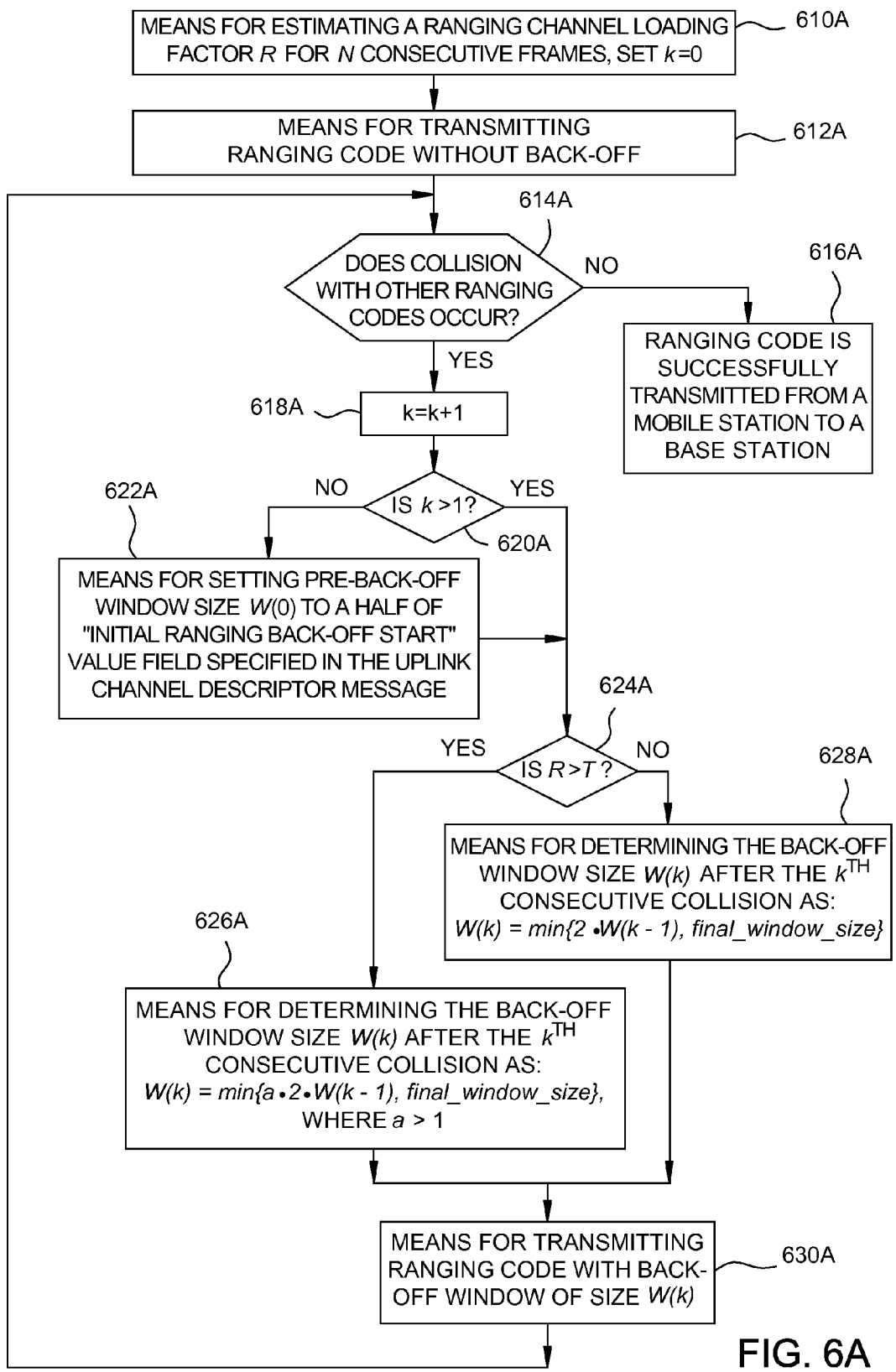
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, blocks 510-530 illustrated in FIG. 5 correspond to means-plus-function blocks 5 10A-530A illustrated in FIG. 5A. Similarly, blocks 610-630 illustrated in FIG. 6 correspond to means-plus-function blocks 610A-630A illustrated in FIG. 6A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for a wireless communication system comprises:
   monitoring a number of transmission opportunities L allocated for a ranging channel over a period of N uplink frames;
   monitoring a number of received range-response messages K that contain information about ranging codes transmitted in M uplink frames;
   estimating a ranging channel loading factor at or after the Mth uplink frame in which a ranging code is transmitted as a function of K and L; and
   adjusting a size of a ranging back-off window based on the ranging channel loading factor.

2. The method of claim 1, wherein M≧N.

3. The method of claim 1, wherein estimating a ranging channel loading factor at or after the Mth uplink frame as a function of K and L comprises estimating a ranging channel loading factor ratio of K and L.

4. The method of claim 1, wherein adjusting a size of a ranging back-off window based on the ranging channel loading factor, comprises:
   increasing a size of a ranging back-off window by more than two times compared to the previous size of the ranging back-off window if a kth consecutive collision between a transmitted ranging code and at least one of other ranging codes in the system has occurred and an estimated ranging channel loading factor is greater than a predefined threshold value, wherein k>1.

5. The method of claim 1, further comprising:
   increasing the size of the ranging back-off window by two times relative to the previous size of the ranging back-off window if a kth consecutive collision between the transmitted ranging code and at least one of other ranging codes in the system has occurred and the estimated ranging channel loading factor is not greater than the predefined threshold value, wherein k>1.

6. The method of claim 1 further comprising:
   setting a pre-back-off window size according to a value of an Initial Ranging Back-off Start field specified in an Uplink Channel Descriptor (UCD) message if a first collision between the transmitted ranging code and at least one of other ranging codes occurs.

7. The method of claim 6, further comprising:
   setting an initial size of the ranging back-off window as more than two times larger value relative to the size of the pre-back-off window if the first collision between the transmitted ranging code and at least one of other ranging codes in the system has occurred and the estimated ranging channel loading factor is greater than the predefined threshold value.

8. The method of claim 6, further comprising:
   setting an initial size of the ranging back-off window as exactly two times larger value relative to the size of the pre-back-off window if the first collision between the transmitted ranging code and at least one of other ranging codes in the system has occurred and the estimated ranging channel loading factor is not greater than the predefined threshold value.

9. The method of claim 1, wherein a maximum size of the ranging back-off window is determined based on a value of an Initial Ranging Back-off End field specified in the UCD message.

10. An apparatus for a wireless communication system, comprising:
    a circuit configured to monitor a number of transmission opportunities L allocated for a ranging channel over a period of N uplink frames;
    a circuit configured to monitor a number of received range-response messages K that contain information about ranging codes transmitted in M uplink frames;
    a circuit configured to estimate a ranging channel loading factor at or after the Mth uplink frame in which a ranging code is transmitted as a function of K and L; and
    a circuit configured to adjust a size of a ranging back-off window based on the ranging channel loading factor.

11. The apparatus of claim 10, wherein M≧N.

12. The apparatus of claim 10, wherein the circuit configured to estimate a ranging channel loading factor at or after the Mth uplink frame as a function of K and L comprises logic for estimating a ranging channel loading factor ratio of K and L.

13. The apparatus of claim 10, wherein the circuit configured to adjust a size of a ranging back-off window based on the ranging channel loading factor, comprises:
    a circuit configured to increase a size of a ranging back-off window by more than two times compared to the previous size of the ranging back-off window if a kth consecutive collision between a transmitted ranging code and at least one of other ranging codes in the system has occurred and an estimated ranging channel loading factor is greater than a predefined threshold value, wherein k>1.

14. The apparatus of claim 10, further comprising:
    a circuit configured to increase the size of the ranging back-off window by two times relative to the previous size of the ranging back-off window if a kth consecutive collision between the transmitted ranging code and at least one of other ranging codes in the system has occurred and the estimated ranging channel loading factor is not greater than the predefined threshold value, wherein k>1.

15. The apparatus of claim 10 further comprising:
a circuit configured to set a pre-back-off window size according to a value of an Initial Ranging Back-off Start field specified in an Uplink Channel Descriptor (UCD) message if a first collision between the transmitted ranging code and at least one of other ranging codes occurs.

16. The apparatus of claim 15, further comprising:
a circuit configured to set an initial size of the ranging back-off window as more than two times larger value relative to the size of the pre-back-off window if the first collision between the transmitted ranging code and at least one of other ranging codes in the system has occurred and the estimated ranging channel loading factor is greater than the predefined threshold value.

17. The apparatus of claim 15, further comprising:
a circuit configured to set an initial size of the ranging back-off window as exactly two times larger value relative to the size of the pre-back-off window if the first collision between the transmitted ranging code and at least one of other ranging codes in the system has occurred and the estimated ranging channel loading factor is not greater than the predefined threshold value.

18. The apparatus of claim 10, wherein a maximum size of the ranging back-off window is determined based on a value of an Initial Ranging Back-off End field specified in the UCD message.

19. An apparatus for a wireless communication system, comprising:
means for monitoring a number of transmission opportunities L allocated for a ranging channel over a period of N uplink frames;
means for monitoring a number of received range-response messages K that contain information about ranging codes transmitted in M uplink frames;
means for estimating a ranging channel loading factor at or after the Mth uplink frame in which a ranging code is transmitted as a function of K and L; and
means for adjusting a size of a ranging back-off window based on the ranging channel loading factor.

20. The apparatus of claim 19, wherein M≧N.

21. The apparatus of claim 19, wherein the means for estimating a ranging channel loading factor at or after the Mth uplink frame as a function of K and L comprises means for estimating a ranging channel loading factor ratio of K and L.

22. The apparatus of claim 19, wherein the means for adjusting a size of a ranging back-off window based on the ranging channel loading factor, comprises:
means for increasing a size of a ranging back-off window by more than two times compared to the previous size of the ranging back-off window if a kth consecutive collision between a transmitted ranging code and at least one of other ranging codes in the system has occurred and an estimated ranging channel loading factor is greater than a predefined threshold value, wherein k >1.

23. The apparatus of claim 19, further comprising:
means for increasing the size of the ranging back-off window by two times relative to the previous size of the ranging back-off window if a kth consecutive collision between the transmitted ranging code and at least one of other ranging codes in the system has occurred and the estimated ranging channel loading factor is not greater than the predefined threshold value, wherein k>1.

24. The apparatus of claim 19 further comprising:
means for setting a pre-back-off window size according to a value of an Initial Ranging Back-off Start field specified in an Uplink Channel Descriptor (UCD) message if a first collision between the transmitted ranging code and at least one of other ranging codes occurs.

25. The apparatus of claim 24, further comprising:
means for setting an initial size of the ranging back-off window as more than two times larger value relative to the size of the pre-back-off window if the first collision between the transmitted ranging code and at least one of other ranging codes in the system has occurred and the estimated ranging channel loading factor is greater than the predefined threshold value.

26. The apparatus of claim 24, further comprising:
means for setting an initial size of the ranging back-off window as exactly two times larger value relative to the size of the pre-back-off window if the first collision between the transmitted ranging code and at least one of other ranging codes in the system has occurred and the estimated ranging channel loading factor is not greater than the predefined threshold value.

27. The apparatus of claim 19, wherein a maximum size of the ranging back-off window is determined based on a value of an Initial Ranging Back-off End field specified in the UCD message.

28. A non-transitory computer-program product for a wireless communication system, comprising a computer readable medium having instructions stored thereon, the instructions being executable by one or more processors and the instructions comprising:
instructions for monitoring a number of transmission opportunities L allocated for a ranging channel over a period of N uplink frames;
instructions for monitoring a number of received range-response messages K that contain information about ranging codes transmitted in M uplink frames;
instructions for estimating a ranging channel loading factor at or after the Mth uplink frame in which a ranging code is transmitted as a function of K and L; and
instructions for adjusting a size of a ranging back-off window based on the ranging channel loading factor.

29. The computer-program product of claim 28, wherein M≧N.

30. The computer-program product of claim 28, wherein the instructions for estimating a ranging channel loading factor at or after the Mth uplink frame as a function of K and L comprise instructions for estimating a ranging channel loading factor ratio of K and L.

31. The computer-program product of claim 28, wherein the instructions for adjusting a size of a ranging back-off window based on the ranging channel loading factor, comprise:
instructions for increasing a size of a ranging back-off window by more than two times compared to the previous size of the ranging back-off window if a kth consecutive collision between a transmitted ranging code and at least one of other ranging codes in the system has occurred and an estimated ranging channel loading factor is greater than a predefined threshold value, wherein k >1.

32. The computer-program product of claim 28, wherein the instructions further comprise:
instructions for increasing the size of the ranging back-off window by two times relative to the previous size of the ranging back-off window if a kth consecutive collision between the transmitted ranging code and at least one of other ranging codes in the system has occurred and the estimated ranging channel loading factor is not greater than the predefined threshold value, wherein k>1.

33. The computer-program product of claim 28, wherein the instructions further comprise:
  instructions for setting a pre-back-off window size according to a value of an Initial Ranging Back-off Start field specified in an Uplink Channel Descriptor (UCD) message if a first collision between the transmitted ranging code and at least one of other ranging codes occurs.

34. The computer-program product of claim 33, wherein the instructions further comprise:
  instructions for setting an initial size of the ranging back-off window as more than two times larger value relative to the size of the pre-back-off window if the first collision between the transmitted ranging code and at least one of other ranging codes in the system has occurred and the estimated ranging channel loading factor is greater than the predefined threshold value.

35. The computer-program product of claim 33, wherein the instructions further comprise:
  instructions for setting an initial size of the ranging back-off window as exactly two times larger value relative to the size of the pre-back-off window if the first collision between the transmitted ranging code and at least one of other ranging codes in the system has occurred and the estimated ranging channel loading factor is not greater than the predefined threshold value.

36. The computer-program product of claim 28, wherein a maximum size of the ranging back-off window is determined based on a value of an Initial Ranging Back-off End field specified in the UCD message.

* * * * *